Feb. 10, 1953 W. F. JONES 2,628,113
KEYING DEVICE
Filed March 17, 1950
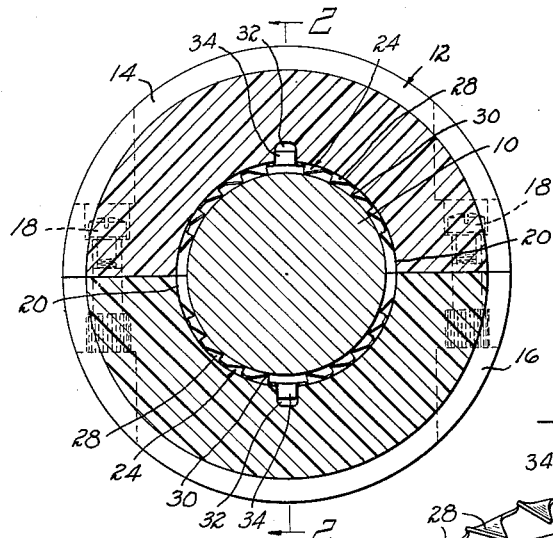
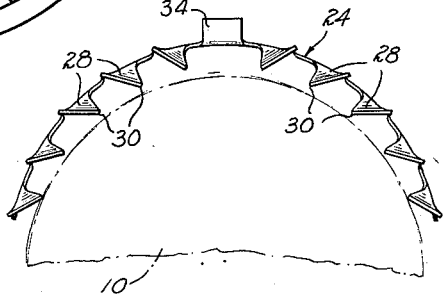
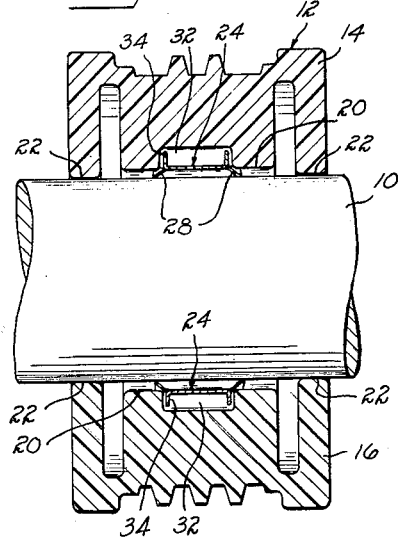
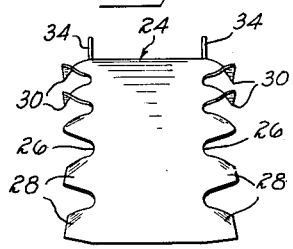
Inventor
WILLIAM F. JONES
By
Lindsey, Prutzman + Just
Attorneys Patented Feb. 10, 1953

2,628,113

UNITED STATES PATENT OFFICE 2,628,113

KEYING DEVICE

William F. Jones, Wethersfield, Conn., assignor to Veeder-Root Incorporated, Hartford, Conn., a corporation of Connecticut Application March 17, 1950, Serial No. 150,327

3 Claims. (Cl. 287—52)

This invention relates to improvements in keying devices and more particularly to a keying device operable to lock a power transmitting member to a drive shaft, for example, so as to prevent rotation between the two.

The object of the present invention is to provide a keying device having means capable of engaging and preferably scoring a shaft incident to being disposed between such shaft and a member to be locked against rotation relative to said shaft, the keying device also incidentally being locked to said member so as to prevent rotation between said member and keying means.

It is another object of the invention to provide a keying means which may be inexpensively formed from resilient strip metal by one or more simple punch press operations, said keying means being provided incidentally to the forming thereof with means for lockingly engaging both a shaft and a member to be keyed thereto by said means.

Details of the foregoing objects and of the invention, as well as other objects thereof, are set forth in the following specification and illustrated in the accompanying drawing forming a part thereof.

In the drawing:

Fig. 1 is a transverse sectional view through a shaft and a member keyed thereto by means embodying the present invention.

Fig. 2 is a longitudinal sectional view taken on the line 2—2 of Fig. 1.

Fig. 3 is a side elevation of a keying means embodying the present invention, said means being shown in contact with a fragmentary portion of a shaft, illustrated in dot and dash lines.

Fig. 4 is an end view of the keying means illustrated in Fig. 3.

Referring to the drawing, in which like numerals are used to indicate like parts illustrated therein, an exemplary shaft 10 is shown which may be any kind of a cylindrical shaft used for transmitting power or otherwise. In accordance with the present invention, the shaft may be formed from any conventional material such as steel and used for transmitting power in various kinds of machinery such, for example, as a loom. Surrounding such shaft is any exemplary power transmitting member such as a bi-partite worm 12. The parts 14 and 16 of the worm 12 may be secured together by any suitable means such as a pair of bolts 18, extending through and between said parts for purposes of securing them together in operative position around the shaft 10, as clearly illustrated in Fig. 1.

In the exemplary embodiment of worm 12 illustrated herein, each of the parts 14 and 16 are provided with axially extending semi-circular cavities 20 adjacent the shaft 10. The parts 14 and 16 are also provided with axially aligned recesses 22 which preferably closely conform to the exterior surface of the shaft 10 so as to prevent any appreciable play between the worm 12 and the shaft 10. The bi-partite construction of the worm permits the attachment thereof to said shaft without requiring, for example, the removal of the shaft from a machine for purpose of attaching the worm thereto, such as under circumstances where the worm is to be attached to the shaft between two bearings supporting the shaft.

The present invention contemplates the use of a plurality of keying devices 24 which are disposed within the cavities 20 in the parts 14 and 16 of the worm 12, said cavities cooperating to form an annular recess around the shaft 10. The keying devices 24 are preferably formed from a flat strip of any suitable resilient material such as spring steel.

Each of the keying devices 24 is provided along opposite side edges thereof with a plurality of inwardly extending slots 26 which are preferably spaced evenly from each other along such edges to provide along the side edges of the devices a plurality of spaced, substantially rectangular fingers 28, extending outwardly from said keying devices. The outer ends of the fingers 28 are twisted substantially about the axes thereof so as to provide a plurality of sharp corners 30 capable of engaging the surface of a shaft 10 when forced into engagement therewith, thereby keying the devices 24 against rotation relative to the shaft 10. The keying devices may be simply and inexpensively formed by one or more punch press operations, for example, and, either before or after such formation, the devices are heat treated to render them resilient and hard so as to be capable of at least slightly scoring the shaft 10 when pressed radially into contact with the shaft or slidably moved relative thereto.

In the preferred embodiment of the invention the keying devices 24 are bent or curved longitudinally so as to substantially conform to the curvature of the exterior surface of the shaft 10, as clearly shown in Fig. 3. Since the keying devices are flexible, they can readily and evenly be moved into engagement with the outer surface of the shaft 10. It will also be noted from Figures 3 and 4, particularly, that, in the preferred embodiment of the invention, the fingers 28 are twisted in such manner that the corners 30 thereof are displaced a substantially greater distance from the concave surface of the devices 24 than the opposite corners of the fingers are displaced from the convex surface of the devices 24.

It will also be noted from Fig. 3 that some of the fingers along each of the side edges of the devices 24 are twisted in one direction while the other fingers on said edges are twisted in an opposite direction, as can be clearly seen from Figures 1 and 3. Thus, regardless of which direction the shaft 10 is rotated, substantially half of the fingers on the keying devices will extend toward the outer surface of the shaft 10 so as to effectively bite into said surface as the rotary movement of the shaft imposes thrust against said fingers when the keying devices are connected to the worm 12 by means to be described.

The sharp corners 30 of the fingers 28 also preferably initially extend radially inward from the concave surface of the keying devices 24 a distance slightly greater than the distance between the base of the cavities 20 and the exterior of the shaft 10. Thus, when the keying devices 24 are disposed within cavities 20 of the parts 14 and 16 of the worm 12, and the parts 14 and 16 are placed around the shaft 10 and connected together by the bolts 18, the tightening of the parts 14 and 16 into operative position will cause the keying devices to closely conform to the shaft 10, whereby the sharp corners 30 of the fingers 28 of said devices will substantially evenly engage and somewhat score the outer surface of the shaft 10, the outer ends of said fingers being somewhat twisted backward toward the plane of the strip portions of the keying devices 24. The corners of the fingers 28 opposite the sharp corners 30 may also be somewhat embedded into the base surfaces of the cavities 20 in the worm 12, especially if the parts 14 and 16 of the worm 12 are formed from such material as synthetic resin or the like, as illustrated in the accompanying drawing. The base surface of the cavities 20 will also firmly back up the convex surface of the keying devices 24 when said parts of the worm are bolted firmly into operative position about the shaft 10, as described above. Thus, fingers 28 are placed under torsional tension and thereby effect efficient scoring engagement between the sharp corners 30 of the fingers and the shaft 10.

To positively insure against any noticeable rotatable movement between the keying devices 24 and the worm 12, parts 14 and 16 of the worm are each preferably provided with locking recesses 32 which extend radially into said parts from the base surfaces of the cavities 20 therein. The locking recesses 32 are capable of receiving one or more ears 34 which are bent to extend radially outward from the opposite edges of the keying devices 24 intermediately of the ends thereof so as to project radially from the convex surface of the said devices, as clearly shown in all of the figures. In the initial formation of the devices, the ears 34 may be blanked out similarly to fingers 28. The side walls of the cavities 32 preferably closely engage opposite side edges of the ears 34, as shown in Fig. 1. It will thus be seen that the ears 34 cooperate with the locking recesses 32 in such a manner as to prevent rotatable movement between the keying devices 24 and the worm 12 and, since the engagement of the fingers 28 with the shaft 10 will prevent rotatable movement between the keying devices 24 and the shaft, it will be seen that the worm 12 will be keyed to the shaft 10.

While the present illustration shows only a single keying device in each part of the worm 12, it will readily be seen that more than one of such keying devices may be used in each part of the worm, as desired or necessary. Further, while the worm has been illustrated as being bipartite to facilitate the assembly thereof relative to the shaft, it will also be understood that the keying devices comprising the present invention may also be used with a unitary worm, or other form of power transmitting means, simply by inserting keying devices within a suitable annular cavity within the worm and then sliding the worm onto a shaft from one end thereof. During such assembly of the worm and shaft, the corners 30 of the fingers of the keying devices will longitudinally score the shaft and thereby effectively prevent rotation between the worm and shaft.

It will thus be seen from the foregoing that the present invention provides means for keying the worm or other form of power transmitting device to a shaft, which means may be uniformly, quickly and inexpensively formed with a minimum of manufacturing operations, yet provide effective locking or keying means capable of long life and even repeated use. Further, said keying devices are of such nature that they require no special tools or skilled operators to effect installation thereof.

While the invention has been illustrated and described in its preferred embodiment and has included certain details, it should be understood that the invention is not to be limited to the precise details herein illustrated and described since the same may be carried out in other ways, falling within the scope of the invention as claimed.

I claim as my invention:

1. A device for keying a member to a cylindrical shaft and comprising a resilient strip of flat material for disposition about the shaft between the shaft and member having along each side edge thereof a row of fingers projecting outward therefrom longitudinally of the shaft, the ends of said fingers being twisted substantially axially thereof to provide a plurality of sharp projections displaced from the plane of said strip and engageable in scoring relationship with said shaft when inserted between said shaft and member, and means on said strip interengageable with said member to lock said strip against rotatable movement relative thereto.

2. A device for keying a member to a cylindrical shaft and comprising a resilient strip of material having along each side edge a row of fingers projecting outward from said strip, said fingers being twisted substantially axially thereof, some in one direction and the others in the opposite direction to provide a plurality of sharp projections displaced from the plane of said strip and engageable in scoring relationship with said shaft when inserted between said shaft and member, and locking means projecting from said strip and interengageable with said member to lock said strip against rotatable movement relative thereto.

3. A device for keying a member to a cylindrical shaft and comprising a resilient strip of flat material curved longitudinally and having along each side edge thereof a row of fingers projecting from said strip, said fingers being twisted about the axes thereof to provide a plurality of sharp corners displaced from the concave surface of said strip and engageable in scoring relationship with said shaft when said strip is inserted between said shaft and member, and an ear bent radially outward from each side edge of said strip intermediately of the ends thereof and projecting from the convex surface thereof, said ears being receivable within a suitable recess within said member to lock said strip against rotatable movement relative thereto.

WILLIAM F. JONES.

REFERENCES CITED

The following references are of record in the file of this patent:

UNITED STATES PATENTS

| Number | Name | Date |
| --- | --- | --- |
| 832,015 | Frazee | Sept. 25, 1906 |
| 1,896,650 | Trotter | Feb. 7, 1933 |
| 2,074,625 | Spaunberry | Mar. 23, 1937 |
| 2,322,138 | Jenny | June 15, 1943 |